(12) United States Patent
Gong (10) Patent No.: US 8,676,765 B2
(45) Date of Patent: Mar. 18, 2014

(54) DATABASE ARCHIVING PERFORMANCE BENEFIT DETERMINATION

(75) Inventor: Yu Gong, Half Moon Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 230 days.

(21) Appl. No.: 13/181,014

(22) Filed: Jul. 12, 2011

(65) Prior Publication Data

US 2013/0018847 A1    Jan. 17, 2013

(51) Int. Cl.
*G06F 17/30* (2006.01)
(52) U.S. Cl.
USPC ............ 707/667; 707/661; 707/665; 707/718
(58) Field of Classification Search
USPC .................................. 707/661, 665, 667, 718
See application file for complete search history.

(56) References Cited

U.S. PATENT DOCUMENTS

| | | | | |
|---|---|---|---|---|
| 6,115,509 | A * | 9/2000 | Yeskel | 382/309 |
| 7,058,560 | B1 | 6/2006 | Arakawa et al. | |
| 2005/0033734 | A1 | 2/2005 | Chess et al. | |
| 2006/0074970 | A1 * | 4/2006 | Narayanan et al. | 707/102 |
| 2008/0222644 | A1 * | 9/2008 | Richards et al. | 718/104 |
| 2009/0024982 | A1 * | 1/2009 | Diep et al. | 717/115 |
| 2010/0082599 | A1 | 4/2010 | Graefe et al. | |
| 2010/0082602 | A1 * | 4/2010 | Ganapathi et al. | 707/718 |
| 2012/0036327 | A1 * | 2/2012 | Jennas et al. | 711/137 |
| 2012/0209831 | A1 * | 8/2012 | Rehman | 707/723 |

OTHER PUBLICATIONS

Article entitled "HP Database Archiving", by HP, dated Sep. 23, 2010.*
Article entitled "HP Database Archiving Software", by HP, dated Feb. 2010.*
Article entitled "Database Archiving is necessary, not optional!", by Wuerz, dated Jul. 30, 2007.*
Article entitled "HP StorageWorks Reference Information Manager for Databases", by HP, dated Jun. 16, 2006.*
Article entitled "HP StorageWorks Reference Information Manager for Databases: An HP database archive solution", by HP, dated Aug. 2005.*
Article entitled "Choosing the Right Archival Solution—HP Leads the Way", by McAdam, Feb. 14, 2007.*
Article entitled "HP Information Lifecycle Management (ILM): RIM for Databses", by HP, Copyright 2006.*

* cited by examiner

*Primary Examiner* — Mahesh Dwivedi (57) ABSTRACT

A database archiving performance benefit determination system may include a data reduction module to ascertain a reduction value of data stored on a database, and a database setup module to ascertain a setup of the database. A performance modeling module may calculate a performance increase for a database application using the database based on the reduction value, the setup of the database, and at least one parameter representing the database application.

14 Claims, 4 Drawing Sheets

DATABASE ARCHIVING PERFORMANCE BENEFIT DETERMINATION

BACKGROUND

In databases and other systems, information that is not needed in the near future may be archived to allow an application to run more efficiently without processing of unnecessary data. The archived data may be considered inactive data, which stands for data that is useful but not immediately useful, or known not to be needed for some time. If the data is supported by structural information, the archiving may be performed in an organized manner to facilitate retrieval and other operations on the data. For unstructured data, although a file containing the data may be archived, the contents of the file may not be readily realized or manipulated.

BRIEF DESCRIPTION OF DRAWINGS

The embodiments are described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It is apparent that the embodiments may be practiced without limitation to all the specific details. Also, the embodiments may be used together in various combinations.

1. Overview

A variety of commercially available tools provide for database archiving by removal of inactive data to an archive site. When data is removed from a database to an archive site, one benefit is the lower storage cost of the archive site, which may also be provided by commercially available tools when comparing archived versus non-archived data. Another benefit is the presumed performance increase of an application working with the data. Per industry research, it has been estimated that at any given time, approximately 15% of data in a database is needed for an application, with the rest of the data being inactive. As a result, when an application is run on a database carrying 85% of inactive data, the application can run slower. For example, for business analysis applications, such applications may scan an entire database and are therefore susceptible to longer run times depending on the amount of inactive data in a database. For example, a business analysis application may generally analyze and summarize data to get averages from a data set. Thus a database may be scanned, relevant data located, and standard deviation or average type analysis may be performed. For example, time-series analysis may be performed (for example, performance of one quarter vs. the same quarter the previous year). If such an application scans an entire database carrying 85% inactive data, the speed of the analysis can be expected to be compromised. Theoretically, it will be effective if filter conditions are added to applications so that they can avoid scan of inactive data. In reality however, applications are not easily changeable once deployed. In this case, physical removal of inactive data from tables of a database may be needed. Thus one solution may be to archive inactive data whenever possible. However, the cost of archiving may outweigh the speed gain realized. For example, if a database application mostly reuses newly generated data in memory and inserts into the database after completion of an operation, i.e., CPU-bound, the size of the database would be irrelevant. Thus archiving would provide no or a minimal benefit for such an application.

Furthermore, it has been presumed that removing inactive data from a database will result in faster processing of an application using the data. However, removal of inactive data has not been correlated a priori to a quantitative performance increase for an application using the data.

A database archiving performance benefit determination system is described herein and provides an estimate of the performance benefit for a given application if database archiving was to be performed. The system may assist users in making first step decisions on archiving efforts. For example, the performance benefit estimation may assist users in determining whether a database requires archiving or not, or approximately what will be the performance increase after data removal, or whether the cost of archiving will be justified by the performance gain that will be realized. As described below, the system may include a performance calculus that can be trained using sample real-world performance data to increase accuracy.

The system may facilitate optimization of the performance benefit of archiving by generating a curve that shows amount of data archived versus performance of an application. Based on available resources, a database administrator may thus perform archiving on data to attain a desired performance benefit.

In order to determine the performance benefit of archiving, a user may input the hypothetical percentage reduction of data in a database as the result of database archiving, in a data reduction module (described below). The user may further input the setup of the database in a database setup module (described below). Based on these two inputs, the system may calculate the percentage of performance increase for a given application, making use of a training data set, which is a set of heuristic parameters for fine-tuning the accuracy of the calculation (described below). Based on the resulting performance increase, the user may determine, for example, whether or not to perform archiving, or conversely a percentage of inactive data that should be archived to achieve an expected performance benefit. The user may also determine whether or not to postpone archiving. For example, an archiving tool itself may take time to analyze and remove data to an archiving site, and in the process, utilize IT resources that may be used by an application. In this regard, the archiving can be performed at a later time if the archiving itself would slow down performance of an application. Thus a user may postpone archiving to a later time if either the performance gain is minimal or the performance of the application can actually be negatively affected based on the expected performance gains calculated by the system. The system may also provide for modeling of database archiving and the resulting performance gain of an application.

The system may determine performance benefit of archiving on the basis that for databases, the predominant time consumer of database applications are, Structured Query Language (SQL) statements. SQL is a database computer language designed for managing data in relational database management systems (RDBMS). In practice, the set of SQL statements issued by a database application represents the performance characteristics of the application. Therefore, calculating performance changes on these SQL statements is sufficient for predicting the prospective performance for the application. This observation removes the need to trace the tedious execution steps of the application and analyzing SQL statements becomes more systematic because of the existence of "execution plans". A SQL statement may be associated with an execution plan (described below). The execution plan may be the general outline of a process the database will follow in order to retrieve data satisfying the SQL statement. In other words, the execution plan describes the sequence of basic steps the database is going to follow in order to accomplish the work contained in a SQL statement. Database applications may include applications that are related to a database, for example, applications that run on a database, draw data from a database, or place data on a database. A SQL statement may be created by a database application and sent to a database for execution (i.e. to retrieve data, send data to database etc.).

Based on the determined performance benefit, a user may determine, for example, whether a database requires archiving or not, approximately what will be the performance increase after data removal, whether the cost of archiving will be justified by the performance gain that will be realized, or if archiving should be postponed for a given application.

2. System

Figure 1:
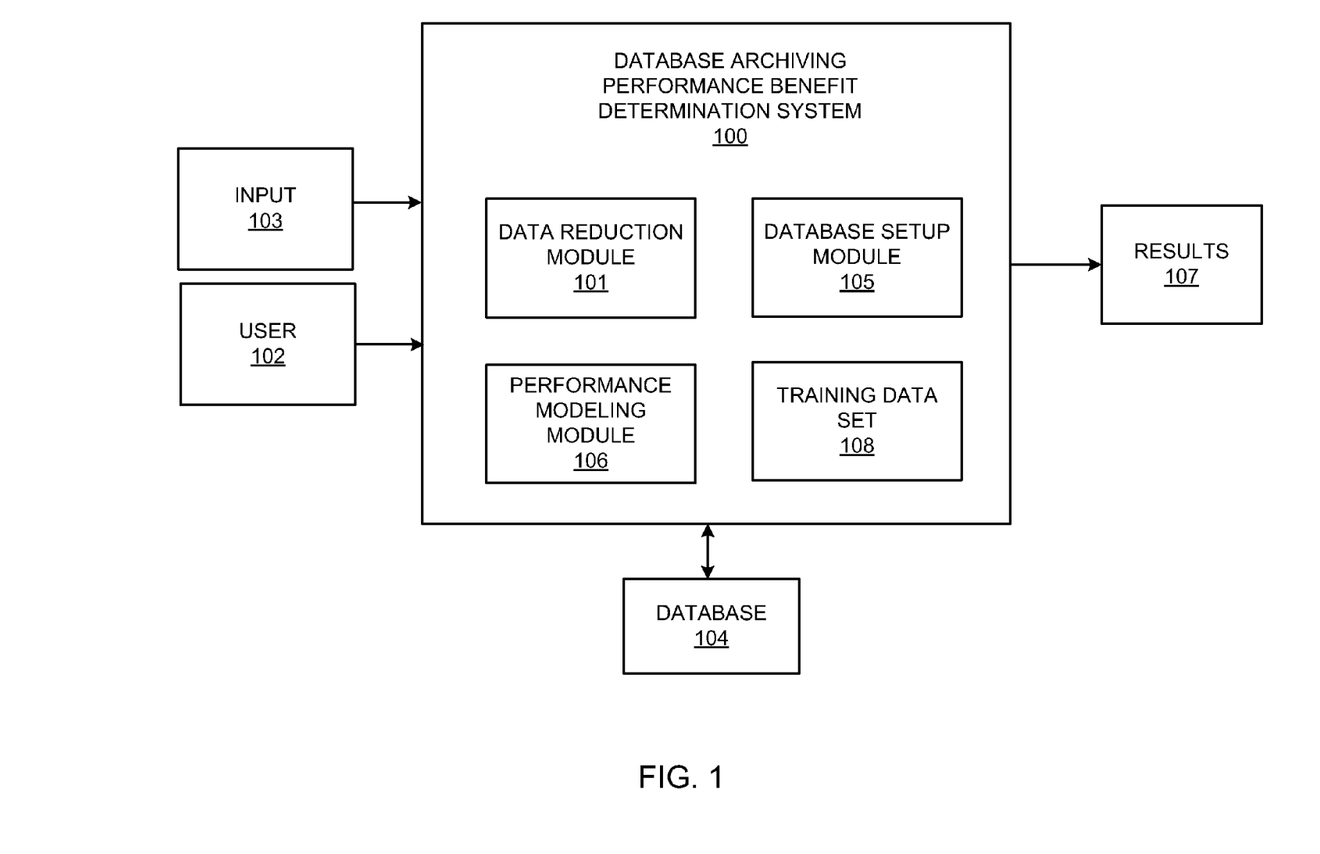
FIG. 1 illustrates a database archiving performance benefit determination system, according to an embodiment.

FIG. 1 illustrates a database archiving performance benefit determination system (hereinafter "archiving benefit determination system") 100, according to an embodiment. The system 100 may include a data percentage reduction module 101 where a user 102 may input at 103, for example, the percentage value or a value otherwise (i.e. any other value related to the amount of data) for data reduction. The modules and other components of the system 100 may include machine readable instructions, hardware or a combination of machine readable instructions and hardware. The user 102 may further input the setup of a database 104 in a database setup module 105 via the input 103. The user 102 may also input a set of parameters that can be used to fine tune the accuracy of performance prediction. This set of parameters form a training data set 108. A performance modeling module 106 may model the resulting performance gain by generating results at 107, for example, as a performance increase value or as a curve that shows amount of data archived versus performance of an application.

Figure 2:
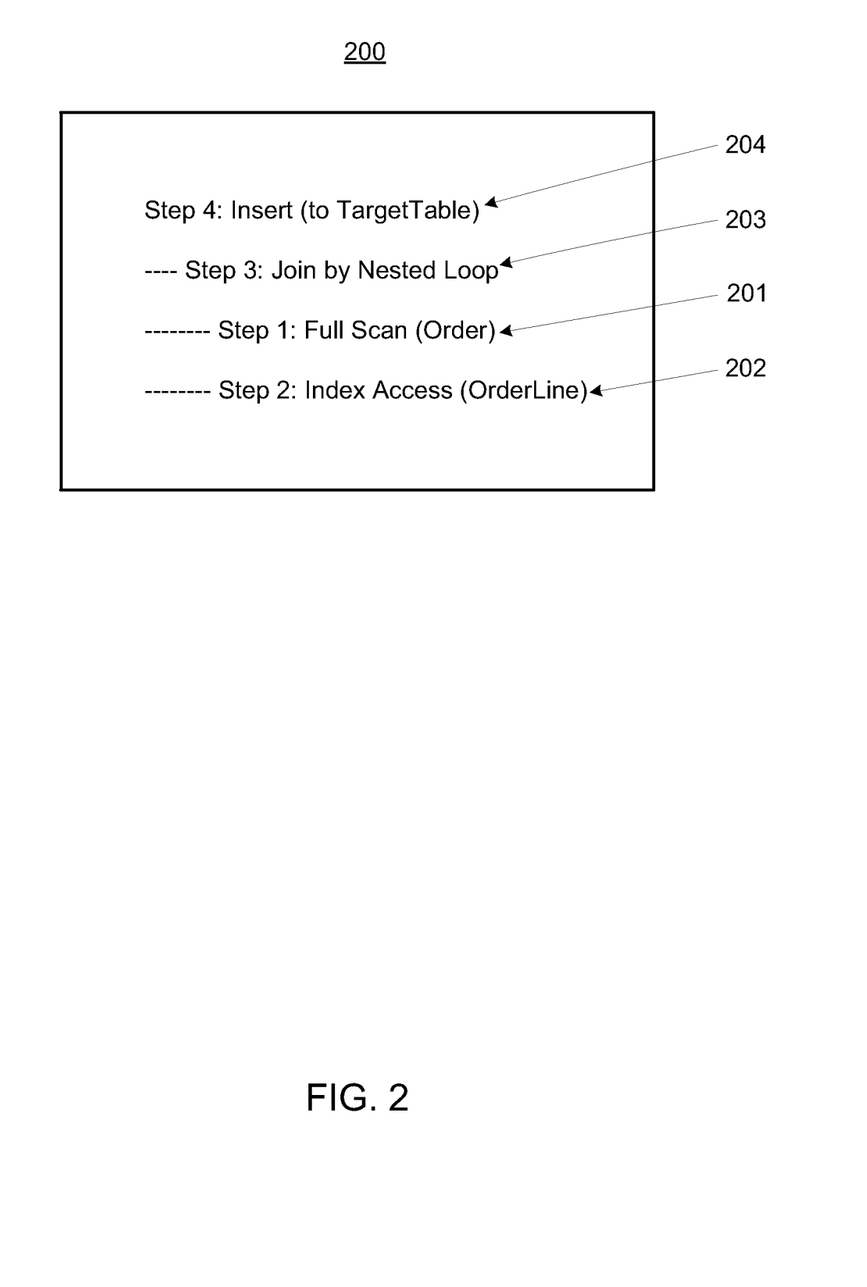
FIG. 2 illustrates an example of an execution plan used with the database archiving performance benefit determination system, according to an embodiment.

The system 100 may determine performance benefit of archiving on the basis that for databases, the time consumer of database applications are SQL statements. A SQL statement may be associated with an execution plan. Referring to FIG. 2, an execution plan 200 may be a tree like description of basic execution steps. For example, given the following SQL statement: Insert into TargetTable Select*From Order, OrderLine where Order.Order_Id=OrderLine.Order_Id; the execution plan 200 of FIG. 2 may include Steps 1-4, respectively designated, 201-204. The indentations in FIG. 2 show the dependencies among steps in the execution plan, with the first step being the most indented. Each step in the execution plan may be very basic and clearly defined, and have statistics about the amount of work. Most commercial database management systems keep statistics about all aspects of the database and its operations. Example statistics for performance prediction may include table size, row size, index size, number of rows processed by an execution step, etc. Further, performance changes of some steps can be straightforward to estimate, particularly those steps that directly access tables and indexes.

Referring to FIG. 2, for the foregoing example of Order and OrderLine tables, on the first line, Step 4 at 204 (Insert (to TargetTable), Step 4 would be the last step in the execution plan. Step 4 depends on Step 3, that provides data to Step 4. For Step 3 at 203 (Join by Nested Loop), the join function joins the Order and OrderLine tables. For each Order table row, the corresponding OrderLine table row may be found, with the condition Order_Id being equal. In order to pair the Order and OrderLine data for the Order_Id column, as shown in Step 1 at 201, a full scan may be performed of the Order table. For every row, the OrderLine table may be accessed to find rows with equal Order_Id values. This is how a SQL statement may be implemented in the database, and as described above, is called the execution plan. In the execution plan of FIG. 2, Step 4 depends on everything to the right (i.e. Steps 1-3), Step 3 depends on Steps 1 and 2, and Step 1 is the lowest level step. The system 100 may thus determine the performance increase of database archiving based on an execution plan as illustrated in FIG. 2. By starting at the lowest level (i.e. Step 1), the performance impact of each step may be evaluated.

For example, referring to FIG. 2, for Step 1 at 201 (Full Scan (Order)), if the Order table is archived with a 30% reduction in size, a 30% performance increase would likely be seen on the access time. Thus for a step such as Step 1, it can be seen that a 30% reduction in size will most likely result in a 30% performance increase on the access time. Thus the performance increase of full scan may be estimated accordingly. For almost every step in the execution plan, the system 100 may utilize the input from the database setup module 105, which offers information and statistics about data layout, and the input from the training data set 108, which offers adjustment parameters, to decide how to calculate the performance changes. The performance adjustment parameters in the training data set 108 are subject to real-world learning. For example, the performance increase for Step 1 at 201 should be 30%*F, where F is the adjustment parameter. There are various ways to "learn" the correct adjustment value. One way is through trial and error, i.e., just set F to a value, e.g. 1, obtain a performance result. If the final result is confirmed as accurate, then F is correct and can be used for future prediction. Otherwise, the value of F may be changed and the process repeated. Another way is to design a simple mini test on the actual system to measure this adjustment factor. Thus, the adjustment factor F that can be trained using real-world settings may be added in the performance prediction formula at each step. Therefore, for the sake of clarify, in the following, these factors are omitted.

For example, if the index height is shortened in Step 2 at 202 (Index Access (OrderLine)), the performance modeling module 106 may forecast a 100% performance gain to Step 2. For example, for Step 2, the height of the index determines the speed of index access. An index may be a tree structure that is traversed, and includes a path, at the end of which a pointer points to the actual data. Thus reducing 30% of data may contribute to reduction in index height. Normally the height of the index may be 1 or 2. If data is reduced, for example, by 30%, the height of the index may be reduced by 1, which would result in a 100% performance increase for Step 2. Reduction in the index height is dependent on the current database configuration, or how saturated the index becomes. The index statistics can be provided by a database management system (i.e. the current index height, the saturation (whether it is almost full or not) etc.). By use of these statistics, the system 100 may determine whether the index structure will remain at the same height after data reduction or whether there will be a height reduction. If there is no height reduction, then no performance increase will be realized.

It should be noted that index structures for different databases are different. For example, Oracle and SQL server index structures are different. Thus reducing 30% data for SQL server may not change the index height, whereas for Oracle, reducing 30% data may change index height. Thus the height reduction is platform dependent. For the foregoing example, it is assumed that based on the statistics provided by the database system, a 30% reduction in data results in a 50% reduction in the index height.

The performance modeling module 106 of the system 100 may follow execution steps (such as those of FIG. 2), and calculate performance changes of each step. The results from lower steps may be fed into higher steps. For example, suppose it is determined that Step 1 would see 30% performance increase, and Step 2 would have 100% performance increase, in order to determine the percentage gain for Step 3, it is noted that Step 3 is a nested loop operation. The Step 3 performance gain is based on what the step is about. Thus Step 3 uses each row from Order table, and looks for a match in OrderLine table. Thus for Step 3, every row in Order table and some of the rows in OrderLine table are reviewed. Suppose originally, before archiving, Step 3 spent X seconds in accessing Order table, and Y seconds accessing OrderLine table, the estimated time spent to complete Step 3, after archive, may be determined as 70%*X+50%*Y (where X and Y are the former duration of times for Steps 1 and 2, respectively). Therefore, for Step 3, the percent of performance gain may be determined as (X+Y)/(70%*X+50%*Y)−100%. However, this formula is not a single percentage value. The system 100 may collect the amount of data (in KBs) corresponding to both X and Y. From the amount of bytes to be processed, the ratio X/Y can be accurately determined. In general, each intermediate step in the execution plan may require a different performance formula. For illustrative purposes, assume X/Y=1000:1, then (X+Y)/(70%*X+50%*Y)=43%.

The performance modeling module 106 may be trained such that the next time a similar amount of data reduction is seen, the system 100 may be able to utilize the training data set and readily ascertain the performance increase. The foregoing performance gain calculations are based on the structured layout of the execution plan. Using the characteristic of each step, the module 106 may use the performance gain of the component step to create an estimate of the current step. Thus the overall performance gain value may be determined accordingly by the module 106 at the top step (Step 4) of the execution plan. For example, assume the amount of data inserted into table TargetTable is the same regardless of if the database is archived or not. Then the performance change of the final step, Step 4 (204) is (X+Y)/(X+Y*58%)−100%, where X is the total time for inserting data into TargetTable, and Y is the total time spent in Step 3. For the foregoing example, it was calculated that Step 3 will increase by 42%. Then after archive, the new Step 3 would complete in Y*58% time. Suppose it is measured on the actual system that X/Y=3:1, the final performance change for the entire SQL statement would be 12%. In other words, the performance increase may be calculated by calculating an intermediate performance increase at each step of the execution plan (or at a plurality of the steps of the execution plan) and calculating an overall performance increase using each intermediate performance increase.

As described above, the user 102 may input the setup of the database 104 in the database setup module 105 via the input 103. The setup of the database 104 may include statistics such as the table size, row size (i.e. how many bytes each row occupies, whether the row is chained etc.), the location of the database disk, the disk throughput etc. The setup would thus describe the environment of the database to the performance modeling module 106.

As described herein, the system 100 thus provides actual estimates of application performance benefit based on database archiving. The system 100 is also "application centric". For example, for database archiving, users have a set of focus applications (or SQL statements), and it is this application set that the users intend to see performance increase for. By drawing SQL statements directly from such focal applications, and estimating performance increases on them, the users can see success in database archiving. The system 100 also explores the regularity in the SQL execution plan, persists this knowledge in the training data set 108, and uses this regularity to ensure the accuracy of the prediction. Aided with training data set, the calculated prediction can be useful to users. The system 100 is also efficient in determining performance increase in that once the input data is collected, the result will be calculated instantaneously, and users may interactively alter the input and see the changes in results.

3. Method

Figure 3:
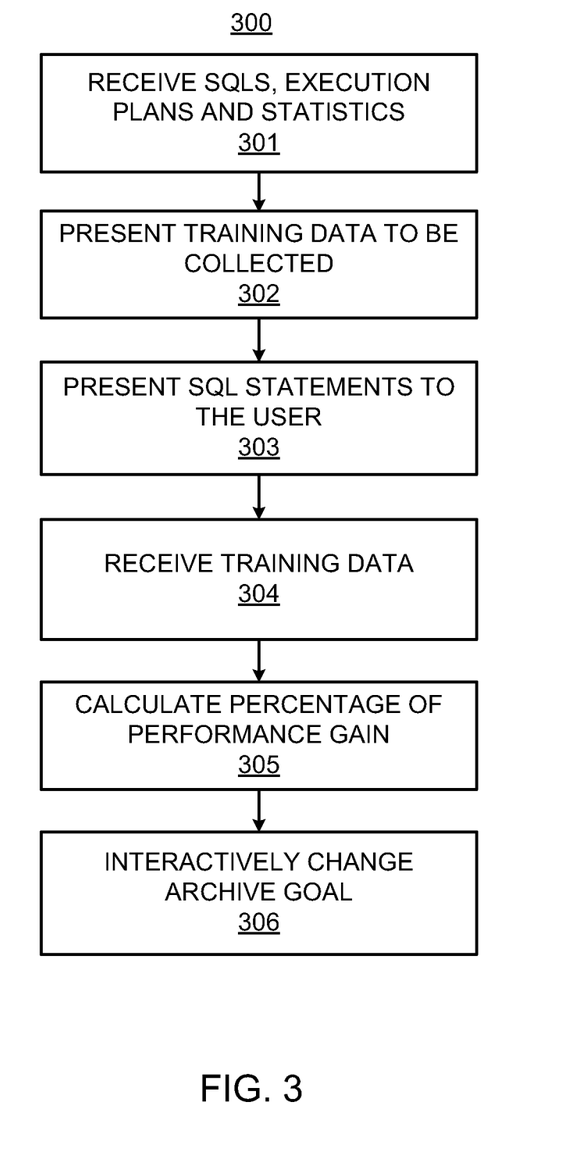
FIG. 3 illustrates a method for database archiving performance benefit determination, according to an embodiment.

FIG. 3 illustrates a method 300 for database archiving performance benefit determination, according to an embodiment. The method 300 is described with respect to the archiving benefit determination system 100 shown in FIG. 1 by way of example and not limitation. The method 300 may be performed by other systems.

At block 301, the system 100 may receive SQLs by the user 102. For example, the user 102 may run a set of applications in their production database(s) and obtain 5-20 top SQLs. At block 301, the system 100 may further receive the SQL execution plans, and related statistics. In a database system, performance may be analyzed on the basis of SQL statements that are generally the time consumer of any application. For example, in a database, SQL server, Oracle etc., utilities may capture the top-running SQL statements (i.e. called top runner). Generally 5-20 top runners for the application represent performance of the application. By capturing the 5-20 top SQLs, a detailed understanding of an application is not needed. Given the SQL statements, an execution plan may be obtained for each SQL statement.

At block 302, the system 100 may present the user 102 a list of training data to be collected. As described above, in order to collect training data, referring to FIG. 2, for Step 1 at 201 (Full Scan (Order)), if the Order table is archived with a 30% reduction in size, a 30% performance increase would likely be seen on the access time. Thus for a step such as Step 1, it can be seen that a 30% reduction in size will most likely result in a 30% performance increase on the access time. Thus the performance increase of full scan may be estimated accordingly. For almost every step in the execution plan, the system 100 may utilize some real measurement from the actual system to decide how to calculate the performance changes. This method of feeding real-life measurement to the system 100 may be designated as training the system 100. Each step of the execution plan 200 may need different kind of training data.

Alternatively, at block 303, the system 100 may give SQL statements to the user 102 to run to collect the training data.

At block 304, the system 100 may receive the training data and prompt the performance modeling module 106 to calculate the performance gain.

At block 305, the performance modeling module 106 may calculate a percentage of performance gain for each SQL statement if, for example, tables in database are reduced by 10%, 20%, etc. Referring to FIG. 1, the results may be output at 107, for example, as a performance increase value or as a curve that shows amount of data archived versus performance of an application.

At block 306, the system 100 may prompt the user 102 to interactively change archive goals (i.e. data reduction value) for each table and change training data set. For example, once the execution plan is obtained, for the system 100, the performance gain results may be generated based on factors such as the statistics collected from the database. Further, the system 100 may obtain an archive goal (i.e. 20% or 30% from the user) and generate results of performance gain. The system 100 may generate a performance gain for each SQL statement. Based on the performance gain for each SQL statement, the user 102 may decide if the gain is sufficient. For example, if a first SQL statement has a 20% performance gain and second SQL statement has a 50% performance gain, if however the second SQL statement is rarely read, then the representative performance gain would be 20%. Based on such analysis, the user 102 may decide whether the performance gain is sufficient or not. If sufficient, then the user may perhaps archive additional data (i.e. from 30% to 50%), at which time the performance modeling module 106 may be re-run to obtain further performance gain results.

4. Computer Readable Medium

Figure 4:
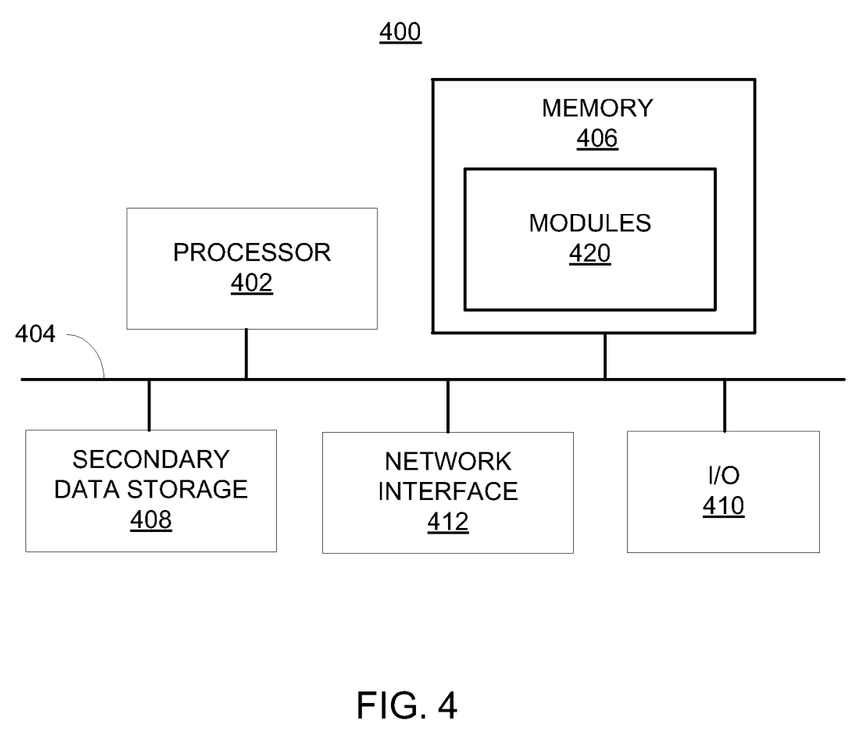
FIG. 4 illustrates a computer system that may be used for the method and system, according to an embodiment.

FIG. 4 shows a computer system 400 that may be used with the embodiments described herein. The computer system 400 represents a generic platform that includes components that may be in a server or another computer system. The computer system 400 may be used as a platform for the system 100. The computer system 400 may execute, by a processor or other hardware processing circuit, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 400 includes a processor 402 that may implement or execute machine readable instructions performing some or all of the methods, functions and other processes described herein. Commands and data from the processor 402 are communicated over a communication bus 404. The computer system 400 also includes a main memory 406, such as a random access memory (RAM), where the machine readable instructions and data for the processor 402 may reside during runtime, and a secondary data storage 408, which may be non-volatile and stores machine readable instructions and data. The memory and data storage are examples of computer readable mediums. The memory 406 may include modules 420 including machine readable instructions residing in the memory 406 during runtime and executed by the processor 402. The modules 420 may include the modules 101, 105, 106 and 108 of the system 100 shown in FIG. 1.

The computer system 400 may include an I/O device 410, such as a keyboard, a mouse, a display, etc. The computer system 400 may include a network interface 412 for connecting to a network. Other known electronic components may be added or substituted in the computer system 400.

While the embodiments have been described with reference to examples, various modifications to the described embodiments may be made without departing from the scope of the claimed embodiments.

What is claimed is:

1. A database archiving performance benefit determination system comprising:
a data reduction module to ascertain a reduction value representing a percentage reduction of data stored in a database;
a database setup module to ascertain a setup of the database, the setup including data layout information and statistics on the database; and
a performance modeling module, executed by a processor, to:
calculate performance changes for a Structured Query Language (SQL) statement associated with an execution plan of a database application, the execution plan including a sequence of steps the database follows to perform work contained in the SQL statement, wherein to calculate the performance changes for the SQL statement, the performance modeling module is to calculate an intermediate performance increase at a plurality of the sequential steps of the execution plan using the data layout information and the statistics on the database, and the reduction value representing the percentage reduction of data stored in the database; and
calculate an overall performance increase for archiving the database at the percentage reduction of data based upon the calculated intermediate performance increases for the database application.

2. The system of claim 1, wherein the overall performance increase is calculated as a percentage performance increase.

3. The system of claim 1, wherein the performance modeling module is trainable using actual performance data, and the overall performance increase is adjusted by a parameter determined from the actual performance data.

4. The system of claim 1, wherein the performance modeling module generates a curve of data reduction versus the overall performance increase for the database application.

5. The system of claim 1, wherein the intermediate performance increase at each of the plurality of the sequential steps is adjusted by a parameter determined from actual performance data.

6. The system of claim 1, wherein the intermediate performance increase at the plurality of the sequential steps is adjusted by parameters determined from actual performance data.

7. A method for database archiving performance benefit determination, the method comprising:
ascertaining a reduction value representing a percentage reduction of data stored in a database;
ascertaining a setup of the database, the setup including data layout information and statistics on the database; and
calculating, by a processor, performance changes for a Structured Query Language (SQL) statement associated with an execution plan of a database application, the execution plan including a sequence of steps the database follows to perform work contained in the SQL statement, and wherein calculating the performance changes for the SQL statement includes calculating an intermediate performance increase at a plurality of the sequential steps of the execution plan using the data layout information and the statistics on the database, and the reduction value representing the percentage reduction of data stored in the database; and
calculating an overall performance increase for archiving the database at the percentage reduction of data based upon the calculated intermediate performance increases for the database application.

8. The method of claim 7, wherein the overall performance increase is calculated as a percentage performance increase.

9. The method of claim 7, further comprising generating a curve of data reduction versus the overall performance increase for the database application.

10. The method of claim 7, wherein the intermediate performance increase at each of the plurality of the sequential steps is adjusted by a parameter determined from actual performance data.

11. The method of claim 7, wherein the intermediate performance increase at the plurality of the sequential steps is adjusted by parameters determined from actual performance data.

12. The method of claim 7, further comprising prompting a user to interactively change the reduction value based on archive goals.

13. A non-transitory computer readable medium storing machine readable instructions, the machine readable instructions when executed by a computer system, cause the computer system to:

ascertain a reduction value representing a percentage reduction of data stored in a database;

ascertaining ascertain a setup of the database, the setup including data layout information and statistics on the database;

calculate performance changes for a Structured Query Language (SQL) statement associated with an execution plan of a database application, the execution plan including a sequence of steps the database follows to perform work contained in the SQL statement, wherein to calculate the performance changes for the SQL statement, the machine readable instructions are to further cause the computer system to calculate an intermediate performance increase at a plurality of the sequential steps of the execution plan using the data layout information and the statistics on the database, and the reduction value representing the percentage reduction of data stored in the database; and calculate an overall performance increase for archiving the database at the percentage reduction of data based upon the calculated intermediate performance increases for the database application.

14. The computer readable medium of claim 13, wherein the intermediate performance increase at the plurality of the sequential steps is adjusted by parameters determined from actual performance data.

* * * * *

UNITED STATES PATENT AND TRADEMARK OFFICE
CERTIFICATE OF CORRECTION

| | | |
|---|---|---|
| PATENT NO. | : 8,676,765 B2 | Page 1 of 1 |
| APPLICATION NO. | : 13/181014 | |
| DATED | : March 18, 2014 | |
| INVENTOR(S) | : Yu Gong | |

It is certified that error appears in the above-identified patent and that said Letters Patent is hereby corrected as shown below:

In the Claims:

In column 10, line 1, in Claim 13, before "ascertain" delete "ascertaining".

Signed and Sealed this
Twelfth Day of August, 2014

Michelle K. Lee
*Deputy Director of the United States Patent and Trademark Office*